E. E. DICKERSON.
APPARATUS FOR CLEANING COTTON.
APPLICATION FILED MAR. 1, 1915.
1,203,709.
Patented Nov. 7, 1916.
2 SHEETS—SHEET 1.
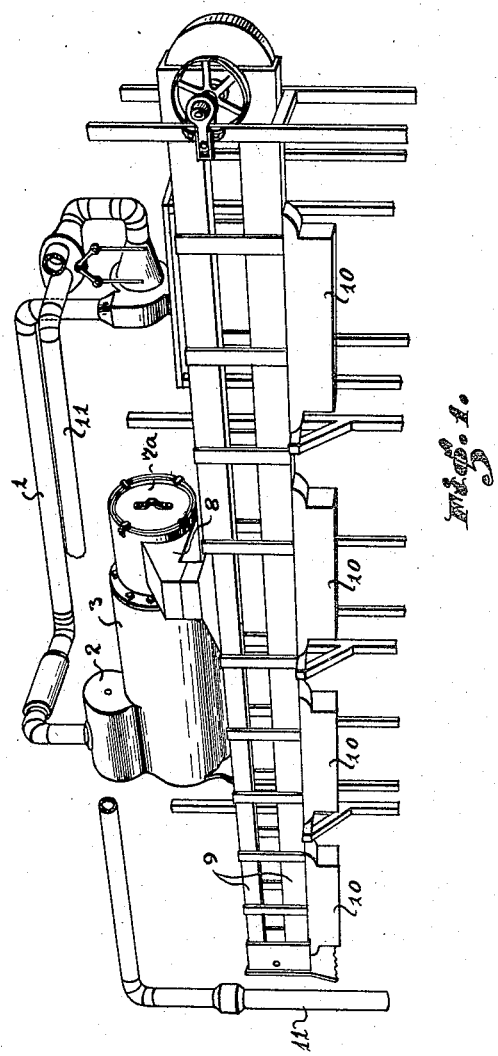
WITNESSES:
INVENTOR
E. E. Dickerson
BY
ATTORNEY E. E. DICKERSON.
APPARATUS FOR CLEANING COTTON.
APPLICATION FILED MAR. 1, 1915.
1,203,709.
Patented Nov. 7, 1916.
2 SHEETS—SHEET 2.
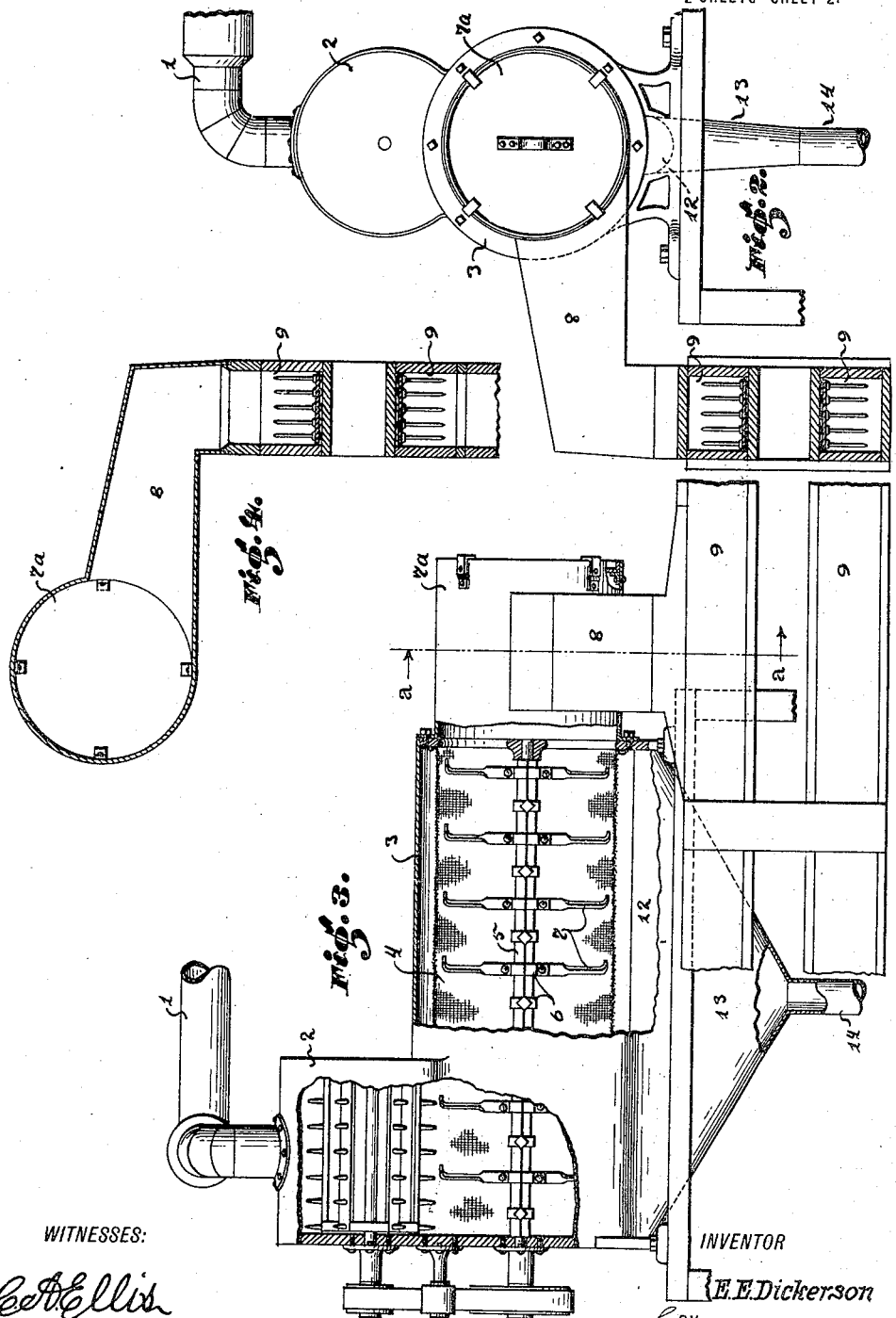
WITNESSES:
INVENTOR
E. E. Dickerson
BY
ATTORNEY

UNITED STATES PATENT OFFICE.

EUSTICE E. DICKERSON, OF FORT WORTH, TEXAS.

APPARATUS FOR CLEANING COTTON.

1,203,709.  Specification of Letters Patent.  Patented Nov. 7, 1916.

Application filed March 1, 1915. Serial No. 11,169.

*To all whom it may concern:*

Be it known that I, EUSTICE E. DICKERSON, a citizen of the United States, residing at Fort Worth, in the county of Tarrant and State of Texas, have invented certain new and useful Improvements in Apparatus for Cleaning Cotton, of which the following is a specification.

My invention has relation to an improvement in the apparatus for cleaning cotton and feeding the same to the cotton gin described and claimed in an application for patent filed by me under date of January 23rd, 1915, and Serial No. 4006, and in such connection it relates more particularly to that part of the said apparatus wherein the cotton boll after being broken is passed through a stirring or fluffing mechanism prior to its conveyance to the gin.

In my former application the cotton after it leaves the stirring and fluffing chamber is conveyed by a pipe to and fed into the gin under air pressure, and the dirt from the cotton in the stirring and fluffing chamber drops into a trough from which it is conveyed by a screw conveyer.

In my present improvement, the cotton as it leaves the stirring and fluffing chamber is discharged through a chute onto a belt distributer which leads to the gins and feeds the same in series and as a result of this arrangement I am enabled to use a portion of the air passing through the stirring chamber to blow the dirt from the cotton in said chamber into a trough at the base of the chamber and leading by an outlet to the open air. By my present construction the final cleaning of the cotton prior to its presentation to the gin is positive—the dirt being driven out by pneumatic pressure to the surrounding atmosphere. So far as I am aware this portion of my invention is broadly new.

In addition to the positive cleaning of the cotton by pneumatic means I am enabled to dispense with a screw conveyer which is bulky, heavy and expensive and I regard this feature of my invention as of great importance commercially since it enables the apparatus to be constructed at a much less cost than heretofore.

In the carrying out of my invention, I make use of certain instrumentalities the preferred form of which is illustrated in the accompanying drawings, in which—

Figure 1, is a perspective view of that portion of the apparatus embodying my present improvements. Fig. 2, is an end elevational view, showing the belt distributer in cross-section. Fig. 3, is a side elevational view, partly in section, of the boll breaking chamber, the stirring chamber and the trough and belt distributer, and Fig. 4, is a cross-sectional view on line a—a of Fig. 3 and illustrating the discharge chute and belt distributer.

Referring to the drawings 1 represents the conveyer pipe entering the boll breaker 2. The construction and arrangement of this boll breaking mechanism is described in detail, in an application for patent filed by me under date of February 1st, 1915, and Serial No. 5530. For the purpose of understanding the present invention it is only necessary to state that cotton from the pipe 1 is passed through the boll breaker 2 under pneumatic pressure and into the stirring and fluffing chamber 3, the breaker 2 being superposed upon the chamber 3 at one end of the cylinder which forms the chamber 3. Inside the cylindric chamber 3 is a screen partition or wall 4, the partition 4 being concentric with the outside imperforate casing for chamber 3. The inner compartment, whose walls 4 are perforated or formed of wire netting, is traversed longitudinally by a revolving shaft 5 having offsets 6 to which the blades or paddles 7 are secured all as clearly shown in Fig. 3 of the drawings of the present application and as described in detail in my application for patent filed January 23rd, 1915, under Serial No. 4006.

The extreme or discharge end of cylindric chamber 3 is in open communication with a barrel shaped compartment 7ª from the periphery of which extends a flue or duct 8 forming a chute leading from the discharge compartment 7ª directly to a belt distributer 9, as clearly illustrated in Fig. 4. The construction and arrangement of the belt distributer 9, *per se*, is well known in the art and such construction forms no part of the present invention.

The belt distributer 9 leads to and discharges in a series of boxes 10 (see Fig. 1) which form the upper entrance to a series of gins not shown. The belt distributer 9 constitutes the feeding mechanism for the gins in series, and the usual suction pipe 11 is employed to take care of the overflow of cotton from the distributer 9 and to return it to the distributer 9 by way of the boll breaker 2 and stirring chamber 3. The casing of chamber 3 is cut away at the base to form a longitudinally arranged opening 12 communicating with a trough 13. This trough viewed in perspective is in the form of a flattened funnel and terminates at its base in a discharge pipe 14 leading to the external air.

In the operation of the device the air accompanying the cotton as it enters the stirring chamber 3 serves primarily to force the cotton through the chamber and into the discharge chamber 7 and flue 8 to the belt distributer. A portion of the air however passes through the screen wall 4 of the concentric compartment of chamber 3 into the trough 13 and out of discharge pipe 14 to the external atmosphere. This portion of air so diverted blows the loose dirt out of the cotton through screen wall 4 into the trough and to the exterior of the apparatus.

Having thus described the nature and objects of my invention what I claim as new and desire to secure by Letters Patent, is—

1. In an apparatus of the character described, a cleaning chamber comprising a screen wall, an imperforate casing surrounding the wall, a shaft and stirring paddles revolving within the screen wall combined with means for introducing air and cotton under pressure to one end of the cleaning chamber, a discharge chamber in open communication with the other end of said cleaning chamber, said discharge chamber having an imperforate wall forming a continuation of the imperforate casing and a chute leading from the periphery of the discharge chamber and forming an outlet from said discharge chamber for said cotton.

2. In an apparatus of the character described, a cleaning chamber having a screen wall and a shaft and paddles revolving within the screen wall, combined with an imperforate casing surrounding the screen wall, a trough constituting a discharge for the dirt and leading from the casing to the external air, a means for introducing air and cotton under pressure to one end of the cleaning chamber, a barrel-shaped discharge chamber in open communication with the other end of the cleaning chamber, said discharge chamber having an imperforate wall forming a continuation of the imperforate walls of the casing and a chute leading from the periphery of the discharge chamber and constituting an outlet for the cotton from the cleaning chamber.

3. In an apparatus of the character described, a cleaning chamber having a screen wall, a stirring and fluffing means rotating within said screen wall and a means for introducing air and cotton under pressure to said chamber, combined with an imperforate casing inclosing the screen wall and projecting beyond the cleaning chamber to form an outlet for the cotton and air from said chamber and a means for discharging dirt, blown through said screen wall from the cotton in its passage through the cleaning chamber, from the imperforate casing to the external atmosphere.

In testimony whereof I have signed my name to this specification in the presence of two subscribing witnesses.

EUSTICE E. DICKERSON.

Witnesses:
 B. D. CRAMER,
 W. A. J. SHADE.

Copies of this patent may be obtained for five cents each, by addressing the "Commissioner of Patents, Washington, D. C."